(12) United States Patent
    Staehle

(10) Patent No.: US 10,293,902 B2
(45) Date of Patent: May 21, 2019

(54) TANGENTIAL FLOW MACHINE

(71) Applicant: Kurt Staehle, Neuhausen-Steinegg (DE)

(72) Inventor: Kurt Staehle, Neuhausen-Steinegg (DE)

( * ) Notice: Subject to any disclaimer, the term of this patent is extended or adjusted under 35 U.S.C. 154(b) by 0 days.

(21) Appl. No.: 15/783,613

(22) Filed: Oct. 13, 2017

(65) Prior Publication Data

US 2018/0105247 A1   Apr. 19, 2018

(30) Foreign Application Priority Data

Oct. 14, 2016   (DE) .......................... 10 2016 119 593

(51) Int. Cl.
| | |
|---|---|
| *B63H 5/14* | (2006.01) |
| *B63H 1/16* | (2006.01) |
| *B63H 1/26* | (2006.01) |
| *B63H 23/24* | (2006.01) |
| *H02K 7/18* | (2006.01) |
| *F03B 13/10* | (2006.01) |
| *B63H 23/00* | (2006.01) |

(52) U.S. Cl.
CPC ................. *B63H 5/14* (2013.01); *B63H 1/16* (2013.01); *B63H 1/26* (2013.01); *B63H 23/24* (2013.01); *H02K 7/1823* (2013.01); *B63H 2001/165* (2013.01); *B63H 2023/005* (2013.01); *F03B 13/10* (2013.01)

(58) Field of Classification Search
CPC ... B63H 5/14; B63H 1/26; B63H 1/16; H02K 7/1823
See application file for complete search history.

(56) References Cited

U.S. PATENT DOCUMENTS

| | | | | |
|---|---|---|---|---|
| 3,011,561 A | * | 12/1961 | Wagener .................. | B63H 1/16 415/126 |
| 5,181,868 A | * | 1/1993 | Gabriel .................... | B63H 5/14 416/177 |
| 6,470,817 B2 | * | 10/2002 | Delfosse ................. | B63B 1/107 114/280 |
| 2018/0010573 A1 | | 1/2018 | Stähle | |

FOREIGN PATENT DOCUMENTS

| | | |
|---|---|---|
| DE | 20552 A1 | 1/1961 |
| DE | 1 997 210 U | 11/1968 |
| DE | 41 05 318 A1 | 8/1992 |
| DE | 102012001107 A1 | 7/2013 |
| DE | 202015003882 U1 | 7/2016 |
| WO | WO 2009/153124 A2 | 12/2009 |
| WO | WO 2014/111844 A1 | 7/2014 |

* cited by examiner

*Primary Examiner* — Stephen P Avila
(74) *Attorney, Agent, or Firm* — Birch, Stewart, Kolasch & Birch, LLP

(57) ABSTRACT

A tangential flow machine can be operated both as electric propulsion and as a generator, having a jacket housing which can have flow passing around it on an outer side, the profile of which is formed on a first front-side opening, and tapers to a second front side, on which a second front-side opening is formed. Between the two front-side openings, there extends a flow path along a main axis, and with an electrical machine, which on the jacket housing has a stator and a rotor that is supported so as to rotate within the stator. The rotor defines a free rotary axis and has a rotor ring and an arrangement of rotor blades which each extend from the rotor ring, radially to a free edge and the free edges of the rotor blades, in the projection direction parallel to the main axis.

19 Claims, 4 Drawing Sheets

TANGENTIAL FLOW MACHINE

Figure 1:
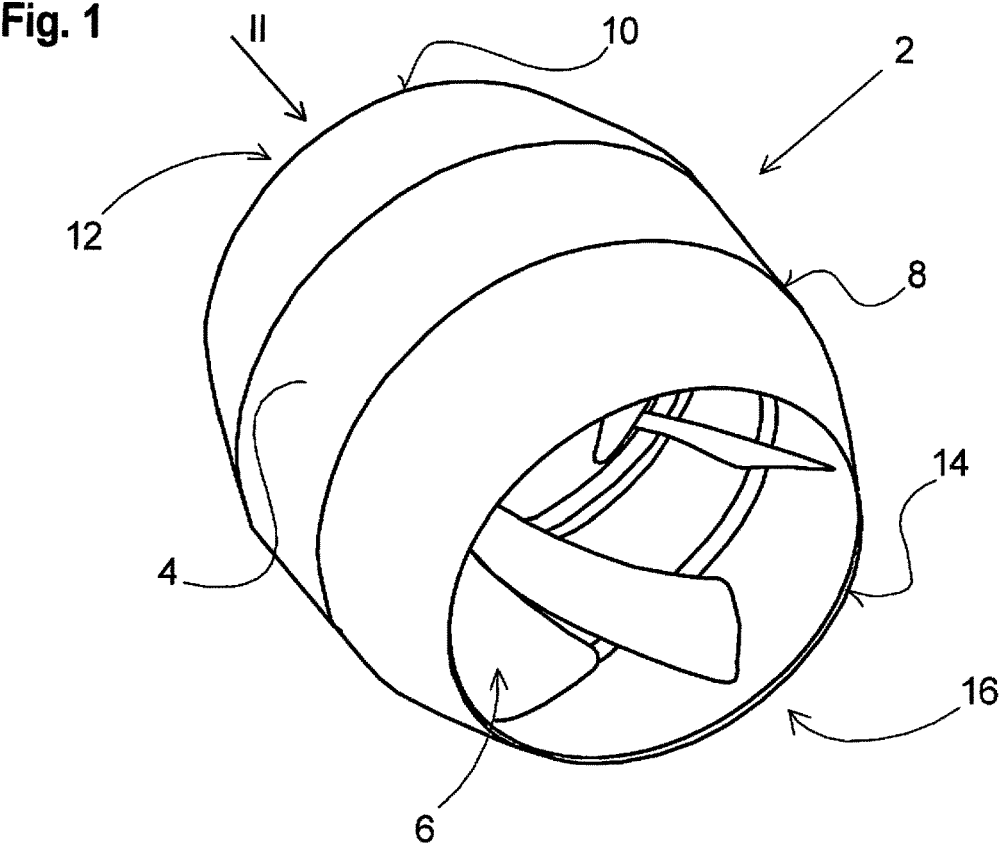

The invention relates to a tangential flow machine which can be operated both as electric propulsion for water-borne vehicles and as a generator to produce electric current from a water flow. For this, the tangential flow machine has a jacket housing which can have flow passing around it on an outer side. The profile of the jacket housing tapers down to a first front side, on which a first front-side opening is formed, and to a second front side, on which a second front-side opening of the jacket housing is formed. Between the two front-side openings, there extends a flow path along a main axis. Additionally the tangential flow machine comprises an arrangement designated as an electrical machine, which on the jacket housing has a stator and a rotor that is supported so as to rotate within the stator. With this, the stator and the rotor have means to be able to convert, in known fashion, a turning motion of the rotor into current, or by application of current to be able to place the rotor in motion. With this the rotor defines a free rotary axis and has a rotor ring and an arrangement of rotor blades which each extend from the rotor ring radially inward to a free edge. These free edges of the rotor blades, in the projection direction parallel to the main axis, border a free circular surface about the free rotary axis.

From WO 2009/153124 A1, a hydroelectric turbine is known that is guided on the bow of a water-borne vehicle and can be used as an electric motor and/or as a generator. The housing of the turbine forms a Kort nozzle which tapers conically in the flow direction. Within the housing, a first rotor is provided, which in propulsive mode generates a flow or is driven by a flow in generator mode. Additionally another rotor is provided, which functions as a Grim's guide wheel, and at least partially compensates for a deviation of the main flow generated by the first rotor from a main flow direction.

What is disadvantageous in the known turbine is that in operation, due to the design and number of rotors, as well as through use of the tapering Kort nozzle, it generates relatively high levels of turbulence and a relatively high stagnation pressure. Especially with use of the tangential flow machine as a generator, and always when the turbine is towed along on a water-borne vehicle driven by another motor, large resistances arise from this, which in turn result in high energy loss.

The object of the invention, with a generic tangential flow machine, is to avoid the above-named drawbacks and make possible more efficient operation.

This object is achieved by a tangential flow machine with the features of claim 1. With this, the rotor blades are formed by baffle plates, which extend in the direction of the main axis at least over the entire axial length of the rotor ring. By this means, the force can be transferred from a water flow passing through the jacket housing to the baffle plates and vice versa over a relatively large surface. By this means, the baffle plates can be situated at a relatively small angle of attack relative to the flow direction. This small angle of attack of the baffle plates ensures that on them, in generator mode, only the inertia of the water mass passing through is acting, and the rotor, when the tangential flow machine has flow passing through it, can be driven without forming relevant turbulences. In addition, this shaping of the baffle plates, especially in interplay with the exterior profile of the jacket housing that tapers toward both of the front sides, makes possible a largely undisturbed separation of a cylindrical core flow from the water body of the body of water in question. When the tangential flow machine has flow passing through it, with this the cutting of the core flow through the baffle plates can be minimized, so that the flow passes through in a very stable way, nearly free of turbulence. Then the cylindrical core flow can again be released in relatively sparing fashion. Through this, overall, the tangential flow machine can be ensured to have especially low resistance in the body of water in question. In this way, especially in generator mode, or when the tangential flow machine is towed along on a water-borne vehicle, the stagnation pressure produced can be substantially reduced. In addition, in drive mode, by means of the baffle plates, a very uniform propulsive flow in the jacket housing can be generated, so that the tangential flow machine in every instance makes possible a very economical operation.

In a particularly advantageous embodiment, the baffle plates extend bilaterally out in the direction of the main flow, over the axial length of the rotor ring. In this way it is possible that the baffle plates extend in the direction of the main axis over a relatively great length, independent of the measurements of the rotor ring. With this, the longitudinal extension of the individual baffle plates can amount to a multiple of the rotor ring, overall or also to either side. The force of the rotor can thereby impinge through the water flow passing through onto a very large surface. In this way it is possible to so configure the baffle plates in terms of surface, independent of the dimensioning of the rotor ring, that in propulsion mode, an optimized propulsion flow can be generated, and in generator mode, the flow resistance of the tangential flow machine is minimized.

With this it is especially favorable if the baffle plates, relative to the main axis, extend over a radial height that amounts to less than 50% of an inner radius of the rotor ring. This results in a relatively small dipping depth of the baffle plates into the resulting flow path. Through this there remains a cylindrical core flow of the water that passes through the tangential flow machine untouched in its center and otherwise is cut from the baffle plates in relatively sparing fashion. By this means, both in propulsion and generator mode, the core flow is highly stable and, after passing through the water turbine, can again be released in relatively sparing fashion.

In advantageous fashion, the baffle plates generate projection surfaces in a projection direction parallel to the main axis, which extend over at least 75% between the free circular surface and the rotor ring. By this means, in the projection direction, the result is a relatively exact adaptation of the rotor blades to the projection circular ring surface, which makes possible an especially effective force or moment transfer from the core flow to the rotor and vice versa. With this, it is especially favorable if the projection surfaces of the baffle plates extend in the projection direction parallel to the main axis together over 100% of the projection circular ring surface. Despite a small angle of attack, to ensure a maximized force transmission within the projection circular ring surface, the projection surfaces can also overlap.

Additionally, it is favorable if the baffle plates are configured symmetrical, to be able to propel the rotor in two opposing flow directions.

In advantageous fashion, additionally with this, the jacket housing is also configured symmetrical, through which the tangential flow machine can attain a comparatively high power in both flow directions.

Additionally, it is favorable if the jacket housing has a cW value of at most 0.4 on both of the front sides. By this means, independent of from which side the tangential flow machine has flow passing through it, the stagnation pressure acting on the tangential flow machine in operation is kept relatively low, and regardless of the operating mode, a relatively sparing release of the exiting flow can be assured.

In advantageous fashion, the jacket housing, on the first front side, has a first cutting edge delimiting a first opening, and a second cutting edge delimiting the second opening on the second front side. These cutting edges make a transition on the sides facing away from each other into a circumferential outer side of the jacket housing, which over its extension parallel to the main axis has a continuous convex contour. What is to be understood here as cutting edges are profiles that taper parallel to the main axis to a tip, which is configured to be sharp-edged or maximally with a radius of 10 mm, preferably maximally 5 mm. Able to be made available through the convex longitudinal profile of the circumferential outer side, is both a small cW value of the jacket housing and a sufficient structural space within the jacket housing to admit structural parts of the electrical machine such as coils, bearings and contact elements. The smooth-flowing transition from the particular cutting edge to the convex contour of the circumferential outer side of the jacket housing makes possible an essentially undisturbed separation of the cylindrical core flow passing through the water turbine from the rest of the body of the flowing water. After separation of the core flow on the one cutting edge, this remaining water body forms a tangential flow, which can in essence flow undisturbed around on the one cutting edge, which especially has no jump-like profile projections, to again merge at the other cutting edge with the core flow that emerges here. Also with this re-entry of the core flow into the remaining flow of the flowing water, due to the cutting edge that is acting here, formation of distinct turbulences can be prevented.

In one advantageous embodiment, the two cutting edges demarcate a free opening surface which at maximum is as large as a surface demarcated by the rotor ring. In this way it can be ensured that at the arrival-flow-side opening a core flow is separated and directed into the tangential flow machine, the cross section or volume of which can overall be admitted without substantial increases in pressure and speed from the rotor and from the flow path. By this means, the core flow can be laminar as it passes through the tangential flow machine, without generating significant swirling or other turbulences. It can be ensured that the core flow passes through the tangential flow machine in especially undisturbed fashion if the free opening surfaces correspond as exactly as possible to a net annular surface of the rotor ring, in which the surface demarcated by the rotor ring is reduced by the maximum effective profile surfaces of the rotor blades about the direction orthogonal to the main axis. Through this adaptation of the front-side entry and exit opening, it can be ensured that the water turbine has undisturbed flow passing through it.

Additionally, it is especially favorable if the electrical machine can be switched between generator mode and propulsion mode, as for example by means of an electrical or electronic control device. By this means it is possible to use the tangential flow machine on a water-borne vehicle, to optionally propel it by means of a battery connected with the electrical machine, or to charge the battery in generator mode by means of the tangential flow machine. In this way, some other propulsion of the water-borne vehicle can be used, such as by sails or an internal combustion engine, or the flowing force of a water current can be used to recover electrical energy and to charge a storage battery aboard the water-borne vehicle.

In advantageous fashion, the jacket housing is situated on the exterior side, particularly on the bow, of a water-borne vehicle. The jacket housing can for example be supported on a control or stabilization device projecting from the bow, such as a keel, a rudder or a stabilization fin, which particularly with retrofitting attachment makes possible easier assembly of the tangential flow machine.

With this it is advantageous if the tangential flow machine is supported so as to pivot on the water-borne vehicle, through which, in propulsion mode, it can itself be used for controlling the water-borne vehicle, or for active support of a controller of the water-borne vehicle.

For this, the tangential flow machine in a preferred embodiment can for example be held on a control rudder and be pivoted together with it vis-à-vis the rest of the water-borne vehicle.

In addition, the main axis of the tangential flow machine in a preferred embodiment is supported so as to pivot in the vertical direction, through which, in propulsion mode, it can be used for example to compensate for a listing, yawing or pitching motion of the water-borne vehicle.

With this, it is particularly advantageous if the tangential flow machine is adjustable via control electronics, which automatically adjust the alignment of the main axis of the tangential flow machine depending on the present alignment of the water-borne vehicle, such as a listing, yawing or pitching angle in particular. By this means, the water-borne vehicle in question can be actively stabilized by means of the at least one tangential flow machine, preferably by means of two or more tangential flow machines.

Additionally, the above-mentioned object is obtained through a water-borne vehicle with at least two tangential flow machines in one of the above-mentioned embodiments, wherein the jacket housing of the tangential flow machines is supported relative to a preset direction of water-borne vehicle travel on sides of the bow facing away from each other. Through this arrangement of the tangential flow machines on at least two sides of the water-borne vehicle, it is possible during travel to have an active navigation aide or an independent control of the water-borne vehicle via the tangential flow machines and also a comprehensive stabilization of the water-borne vehicle.

In addition, such an arrangement in propulsive mode of the tangential flow machines with opposing alignment makes it possible to turn the water-borne vehicle on the spot.

The figures depict an exemplary embodiment of the invention. Shown are:

FIG. 1 a perspective view of an invention-specific tangential flow machine

Figure 2:
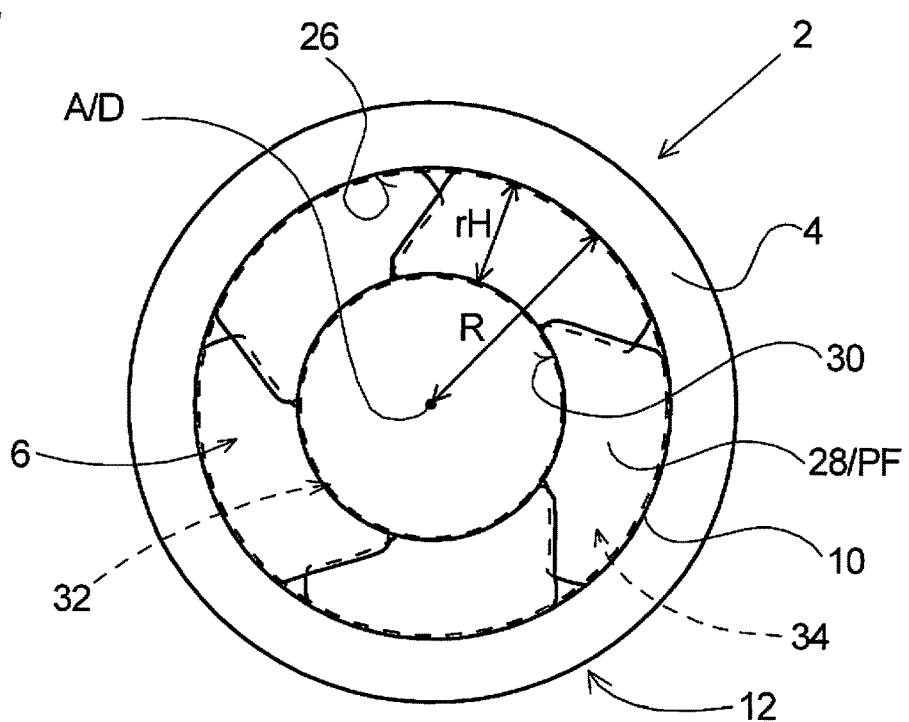

FIG. 2 a top-down view of the tangential flow machine in direction II of FIG. 1

Figure 3:
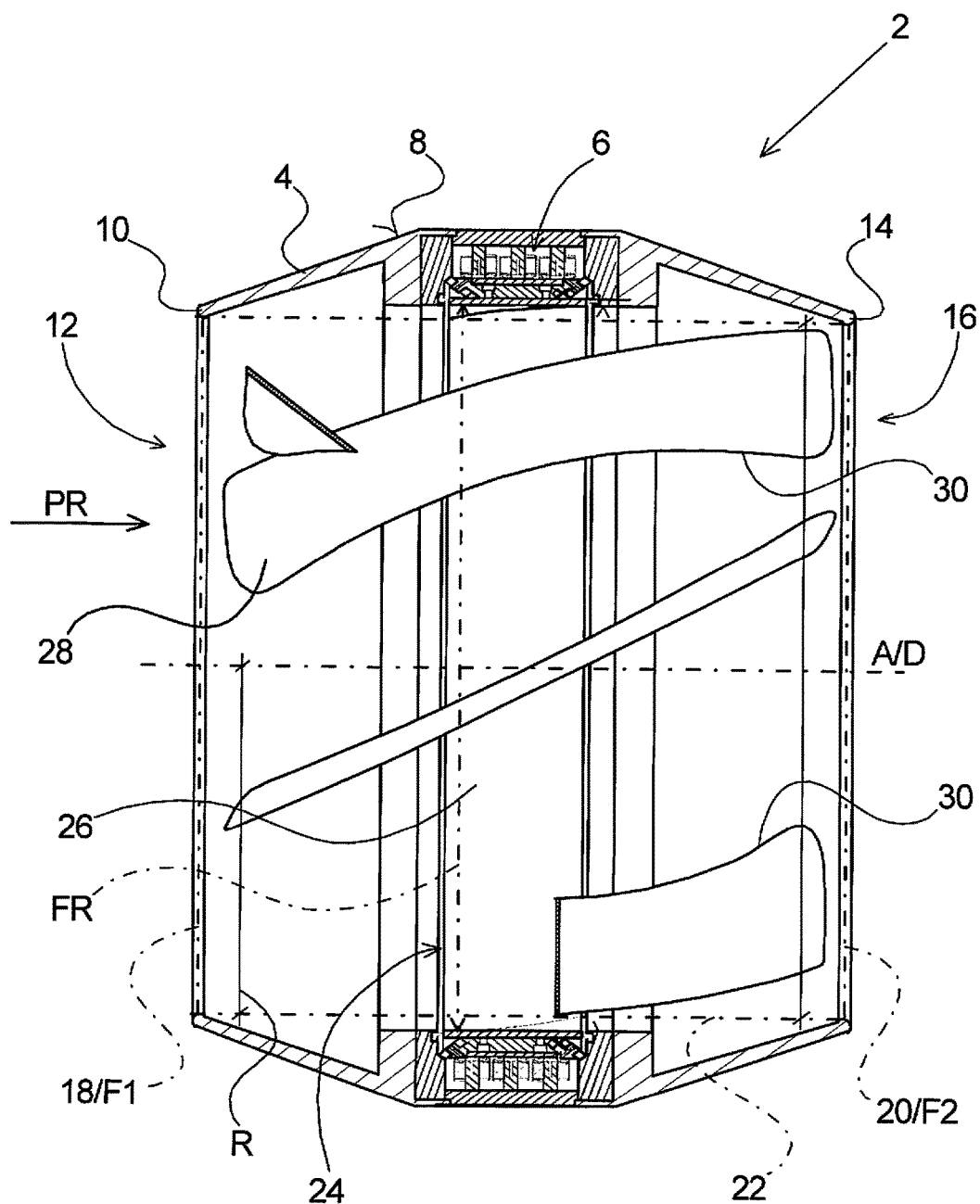

FIG. 3 a longitudinally bisected view of the tangential flow machine according to FIG. 1

Figure 4A:
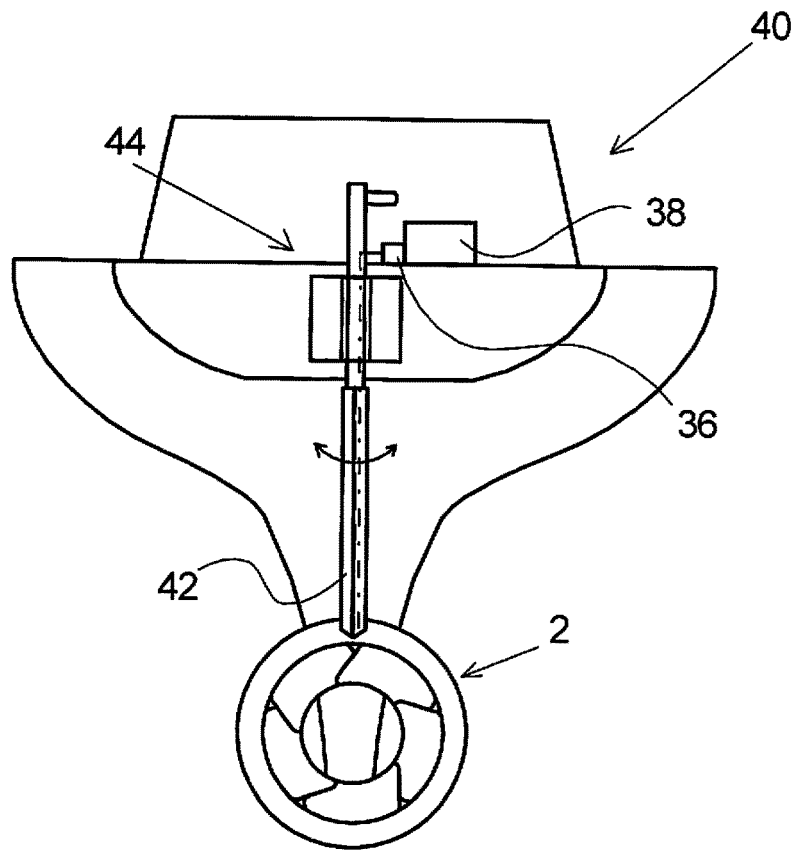

FIG. 4A a view of a water-borne vehicle with a tangential flow machine according to FIG. 1

Figure 4B:
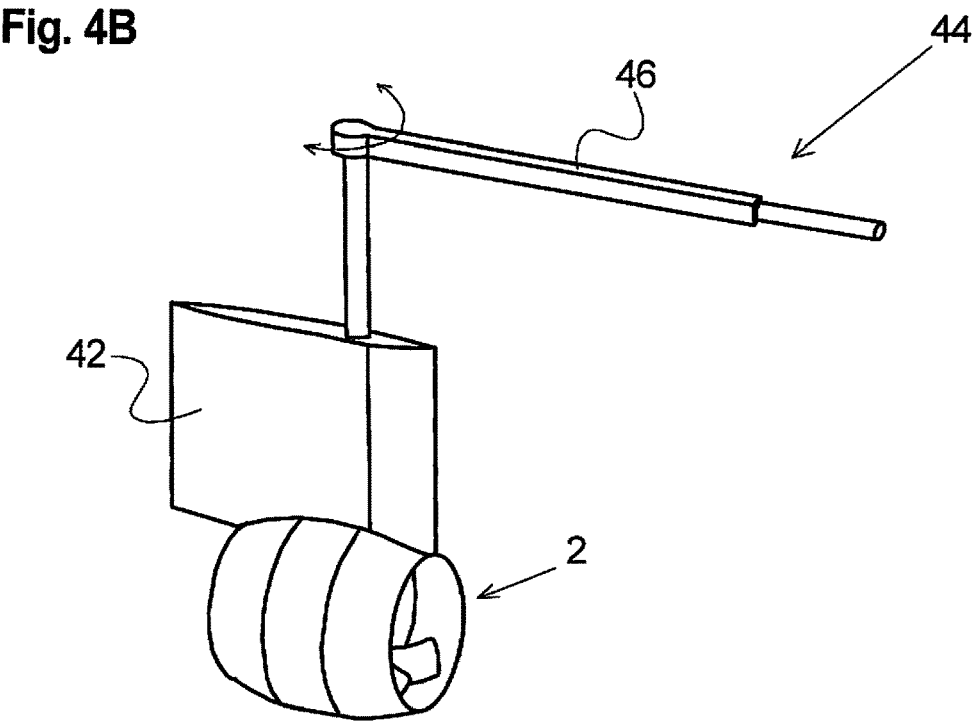
Figure 5:
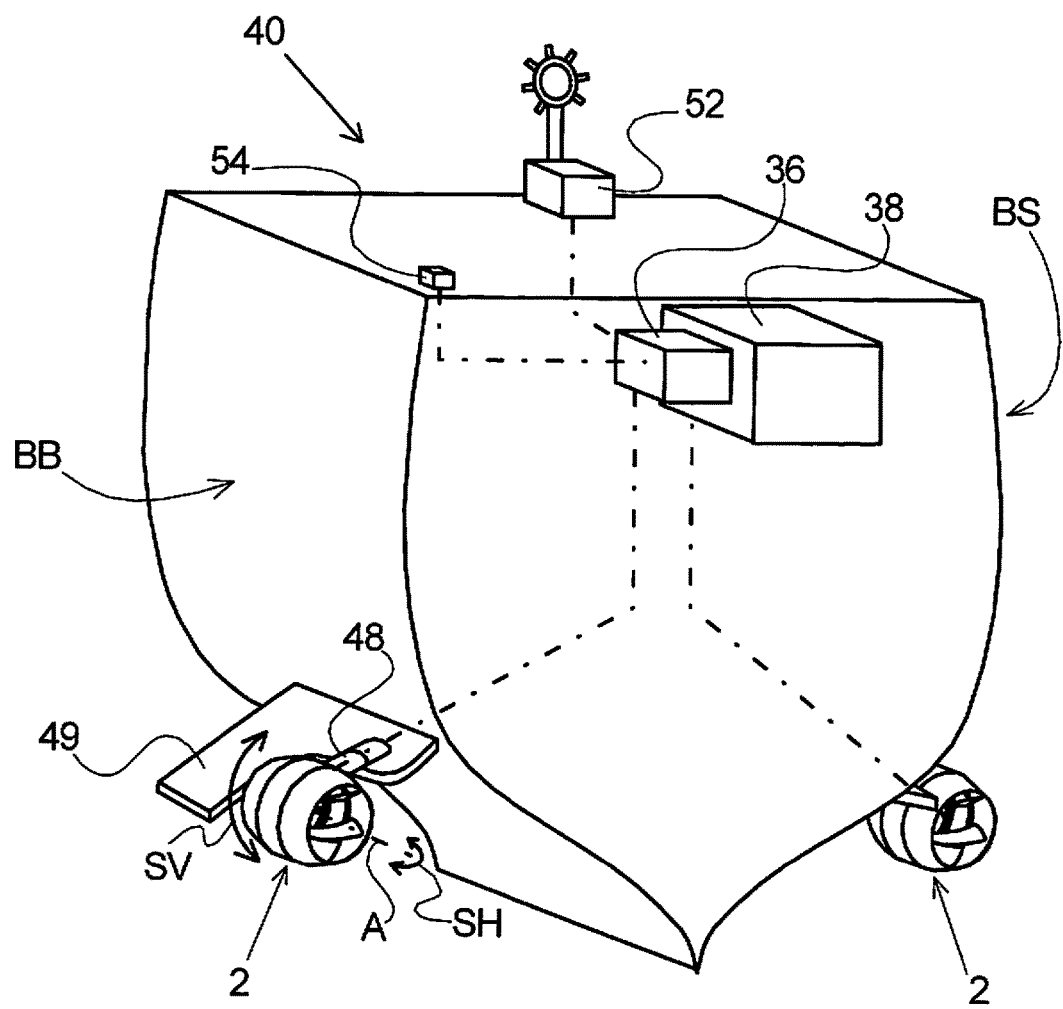

FIG. 4B a perspective view of a control rudder device of the water-borne vehicle according to FIG. 4A, and FIG. 5 a perspective view of a bow section of a water-borne vehicle, on which at least two tangential flow machines according to FIG. 1 are provided.

FIGS. 1 and 2 show a tangential flow machine 2, which can be operated both as a generator for production of electric current from a mass of water passing through or as an electrical drive for a water-borne vehicle. With this, tangential flow machine 2 has a jacket housing 4, in which an electrical machine 6 is accommodated.

Jacket housing 4 is configured so that it can have tangential flow of water on an outer side in essentially disturbance-free fashion. For this, jacket housing 4 forms a circumferential outer surface 8 with a convex contour. In the profile of jacket housing 4, this convex outer surface 8 extends constantly from a first cutting edge 10, which is situated on a first front side 12 of jacket housing 4, to a second cutting edge 14, which is situated on a second front side 16 of jacket housing 4, as can especially be gleaned from FIG. 3.

First cutting edge 10 and second 14 delimit a first front-side opening 18 and a second front-side opening 20, between which a flow path 22 of tangential flow machine 2 extends along a main axis A. Flow path 22 extends through a rotor 24 of electrical machine 6, which is supported so as to pivot relative to a stator 25 of electrical machine 6. With this, stator 25 is admitted as depicted within the convex profile of jacket housing 4. On rotor 24 and on stator 25, means which are not described in more detail are provided for conversion of mechanical motion energy into electrical energy and vice versa, which can assume any known and suitable form. For example, these means can include electrical coils which act in concert with an arrangement of magnets.

Additionally, rotor 24 has a rotor ring 26, from which an arrangement of rotor blades extends into flow path 22. With this, the rotor blades are formed by baffle plates 28, which extend out to both sides over the axial length of rotor ring 26 and form a free edge 30 inward in the radial direction. As can especially be seen from FIG. 2, these free edges 30 of baffle plates 28 delimit a free circular surface 32, which, when rotor 24 makes a turning motion in operation, extends about main axis A and about turning axis D of rotor 24. This free circular surface 32, together with rotor ring 26, delimits a projection circular ring surface 34, which in the projection direction PR parallel to main axis A, is at least for the most part covered by projection surfaces PF of baffle plates 28.

As can be especially gleaned from FIG. 2, the arrangement of baffle plates 28 extends transverse to projection direction PR over at least 75% of projection circular ring surface 34, or preferably completely covers it. In addition, baffle plates 28, within projection circular ring surface 34, have a radial height rH relative to main axis A in the radial direction, which amounts to less than 50% of radius R of flow path 22.

As can be gleaned from FIG. 3, first cutting edge 10 on first front-side opening 18 delimits a free opening surface F1, which in the depicted embodiment is somewhat smaller, and in any case at most is as large, as a surface FR delimited by rotor ring 26. Preferably, free opening surface F1 is at most as large as a net annular surface which results from surface FR minus the maximum cross-sectional surface of baffle plates 28 extending in an orthogonal plane to main axis A. In addition, second cutting edge 14 on second front-side opening 20 delimits a free opening surface F2, which likewise at maximum is as large as surface FR delimited by rotor ring 26 or the net annular surface.

As can further be gleaned from FIG. 3, the baffle plates 28 are configured symmetrical. In addition, also jacket housing 4 is configured symmetric relative to an orthogonal plane to main axis A, and at both front sides has a cW value that is at most 0.4. Due to this symmetry of tangential flow machine 2 and due to this relatively small cW value acting in both directions along main axis A, tangential flow machine 2 can thus be operated in both flow directions at relatively high power.

In addition, due to this it is also possible to switch electrical machine 6 between a generator mode and a propulsion mode. For this, tangential flow machine 2, as depicted in FIG. 4A, is connected via an electrical or electronic control device 36 with a storage battery unit 38. Via this control device 36, an adjustment can be made of whether the storage battery unit 38 is electrically charged by means of tangential flow machine 2 or tangential flow machine 2 is to be propelled by means of storage battery unit 38.

In this way, tangential flow machine 2 for example serves optionally for charging storage battery unit 38 in the form of an onboard battery of a water-borne vehicle 40, or as an electrical drive for same. For this, tangential flow machine 2 as depicted in FIGS. 4A and 4B is for example held on control rudder 42 of a control device 44 of water-borne vehicle 40. By this means, tangential flow machine 2 together with control rudder 42 can be pivoted by means of a handle, such as a tiller 46 or a control wheel, which is not depicted.

Tangential flow machine 2 is usable both as part of a main propulsion system for electric propulsion of water-borne vehicle 40 or as part of an auxiliary propulsion system for active support of control maneuvers, wherein electrical energy recovery is possible in generator mode of machine 6.

In the embodiment as per FIG. 5, tangential flow machine 2 is supported via a pivoting joint 48 on water-borne vehicle 40 so that its main axis A can be adjusted along a pivoting direction SV that in essence is vertical and/or along a horizontal pivoting direction SH. In the depicted embodiment, pivoting joint 48 is for example attached onto a stabilization fin 49 of water-borne vehicle 40, which particularly with retrofitting attachment makes possible easier assembly of tangential flow machine 2.

Water-borne vehicle 40 according to FIG. 5 has a tangential flow machine 2 on each of two bow sides BB and BS which face away from each other. Each of the tangential flow machines 2 are connected via an electrical or electronic control device 36 with an operating stand 52 and or a sensor technology 54. By means of this sensor technology 54, it is continually possible to determine a listing, yawing and/or pitching angle of water-borne vehicle 40.

Depending on the particular current control signals that are issued by control stand 52 and/or sensor technology 54 to the electrical or electronic control device 36, tangential flow machines 2 can be aligned vis-à-vis the rest of water-borne vehicle 40 and controlled in regard to their performance. In this way, water-borne vehicle 40 can, via control stand 52, by means of tangential flow machines 2 themselves or at least manually be controlled with the support of tangential flow machines 2. As an alternative to, or in addition to, this, the tangential flow machines 2 can automatically be aligned in dependence on the signals of sensor technology 54 via the electrical or electronic control device 36 and be controlled in their performance, to compensate for a current listing, yawing or pitching motion of water-borne vehicle 40 and through this, to actively stabilize it.

The invention claimed is:

1. A tangential flow machine which can be operated both as an electrical drive and as a generator, comprising:

a jacket housing around which flow can pass on an exterior side, the profile of which tapers to a first front side on which a first front-side opening is configured, and which tapers to a second front side on which a second front-side opening is configured, wherein between the two front-side openings a flow path extends along a main axis, an electrical machine which on the jacket housing has a stator and a rotor supported so as to turn within the stator, wherein the rotor defines a free turning axis and with this a rotor ring and an arrangement of rotor blades each extending radially inward from the rotor ring to a free edge, and the free edges of the rotor blades in the projection direction parallel to main axis delimit a free circular surface, wherein the rotor blades are formed by baffle plates which extend in the direction of main axis at least over the entire axial length of the rotor ring; and wherein the electrical machine can be switched between generator mode and propulsion mode.

2. The tangential flow machine of claim 1, wherein the baffle plates extend out in the direction of main axis bilaterally over the axial length of the rotor ring.

3. The tangential flow machine of claim 1, wherein the baffle plates relative to main axis extend over a radial height which amounts to less than 50% of the inner radius of the rotor ring.

4. The tangential flow machine of claim 1, wherein the baffle plates in a projection direction parallel to main axis generate projection surfaces, which extend in a projection circular ring surface between the free circular surface and the rotor ring over at least 75%.

5. The tangential flow machine of claim 1, wherein the baffle plates are configured symmetrical.

6. The tangential flow machine of claim 1, wherein the jacket housing is configured symmetrical.

7. The tangential flow machine of claim 1, wherein the jacket housing in the direction of both front sides has a cW value of a maximum of 0.4.

8. The tangential flow machine of claim 1, wherein the jacket housing on the first front side has a cutting edge delimiting the first opening and on the second front side has a second cutting edge delimiting a second opening, which on sides facing away from each other make a transition into a circumferential outer side, which, over its extension parallel to the main axis, has a continuous convex contour.

9. The tangential flow machine of claim 8, wherein both cutting edges delimit a free opening surface, which at maximum is as large as the surface delimited by the rotor ring.

10. The tangential flow machine of claim 1, wherein the jacket housing is situated on the exterior side of a water-borne vehicle.

11. The tangential flow machine of claim 10, wherein the jacket housing is supported so as to pivot.

12. The tangential flow machine of claim 11, wherein the jacket housing is held on a pivotable control rudder of the water-borne vehicle.

13. The tangential flow machine of claim 11, wherein the main axis of the tangential flow machine is pivotable in the vertical direction.

14. The tangential flow machine of claim 11, wherein the tangential flow machine is adjustable via an electrical or electronic control device, which adjusts the alignment of the main axis of the tangential flow machine in dependence on an alignment of the water-borne vehicle.

15. A water-borne vehicle with at least two tangential flow machines of claim 1, wherein the jacket housing of the tangential flow machine, is supported relative to a preset travel direction of the water-borne vehicle on towing sides facing away from each other.

16. The tangential flow machine of claim 2, wherein the baffle plates relative to main axis extend over a radial height which amounts to less than 50% of the inner radius of the rotor ring.

17. The tangential flow machine of claim 2, wherein the baffle plates in a projection direction parallel to main axis generate projection surfaces, which extend in a projection circular ring surface between the free circular surface and the rotor ring over at least 75%.

18. The tangential flow machine of claim 3, wherein the baffle plates in a projection direction parallel to main axis generate projection surfaces, which extend in a projection circular ring surface between the free circular surface and the rotor ring over at least 75%.

19. The tangential flow machine of claim 2, wherein the baffle plates are configured symmetrical.

* * * * *